United States Patent [19]

Serafini

[11] Patent Number: 5,488,932

[45] Date of Patent: Feb. 6, 1996

[54] GASEOUS FUEL ENRICHING SUBSYSTEM

[76] Inventor: Joseph Serafini, 387 Lincoln Ave., Newark, N.J. 07104

[21] Appl. No.: 283,941

[22] Filed: Aug. 1, 1994

[51] Int. Cl.$^6$ ............................ F02B 43/08; F02B 47/08
[52] U.S. Cl. ........................... 123/3; 123/25 B; 123/568
[58] Field of Search .................... 123/25 R, 25 A, 123/25 B, 568, 569, 570, 571.3

[56] References Cited

U.S. PATENT DOCUMENTS

| | | | |
|---|---|---|---|
| 1,675,611 | 7/1928 | Lacy | 123/25 B |
| 1,677,609 | 7/1928 | Abel | 123/25 B |
| 3,968,775 | 7/1976 | Harpman | 123/25 F |
| 4,380,970 | 4/1983 | Davis | 123/25 B |
| 4,503,813 | 3/1985 | Lindberg | 123/25 B |
| 5,131,229 | 7/1992 | Kriegler et al. | 123/25 B |
| 5,376,866 | 3/1995 | Kuntz | 123/25 B |

*Primary Examiner*—Erick R. Solis
*Attorney, Agent, or Firm*—M. K. Silverman

[57] ABSTRACT

A gaseous fuel-enriching subsystem for an internal combustion engine includes a supplemental intake conduit to a an intake manifold internal combustion engine. Such supplemental input is provided with numerus apertures therein. An exhaust gas conduit from the internal combustion engine annularly surrounds the intake conduit permitting fuel values from exhaust in the exhaust conduit to enter the supplemental intake conduit through such apertures. A water supply input to the supplemental intake conduit, at a end opposite to the location of the manifold, provides a further fuel input to the supplemental intake conduit in that water from the water supply is evaporated and then hydrolyzed, separating the water into its chemical constituents of hydrogen and oxygen, thusly producing an enriched gaseous fuel mixture with the recycled exhaust gas which is fed to the manifold.

5 Claims, 1 Drawing Sheet

GASEOUS FUEL ENRICHING SUBSYSTEM

BACKGROUND OF THE INVENTION

The present invention relates an internal-combustion engine and, more particularly, to an internal combustion engine provided with a particularly exhaust gas and external fuel enriching subsystem. The invention further relates to an exhaust gas recycling means, the effect of which is to permit hydrocarbon values or exhaust gas to be utilized by the he internal combustion engine.

Proposals have appeared in the prior art, involving the utilization of exhaust gas and the pressure thereof to compress intake air before its introduction into the combustion chamber of the engine. Such a supercharger is considered advantageous over so-called turbo-superchargers because it provides a high supercharging effect under various engine conditions including low speed operation. An improvement teaching such an engine intake device is taught in U.S. Pat. No. 4,702,218 (1987) to Yoshioka, entitled Engine Intake System Having a Pressure Wave Supercharger. The teaching this reference is that of the use of pressure differentials between the exhaust outlet and the engine intake can be used to accomplish a more efficient burning of the engine fuel.

U.S. Pat. No. 5,131,229 (1992) to Kriegler, entitled Internal Combustion Engine with Exhaust Gas Turbocharger teaches the use of cooling techniques to accomplish recycling of uncombusted fuel values from the exhaust gas stream.

In addition, the instant invention relates to a gaseous fuel enriching subsystem which is not reliant on cooling and is not primarily reliant upon pressure differentials between the engine exhaust and the engine intake. Rather, the invention, as is more fully set forth below, is directed to a system which, in addition to utilizing uncombusted fuel within the exhaust, adds thereto hydrolyzed water to enrich the thermal values of a gaseous mixture of auxiliary fuels provided to the engine.

SUMMARY OF THE INVENTION

There is provided a fuel enriching subsystem for an internal combustion engine which includes a separate and independent fuel intake to the intake manifold of the engine. There is, more particularly, furnished, annularly within the exhaust gas conduit, an engine intake conduit having therein a multiplicity of apertures, such that a relative negative pressure, i.e., vacuum, within said supplemental conduit, relative to the pressure within said circumferentially surrounding exhaust gas conduit, will enable a substantial proportion of the exhaust gas to be drawn through said apertures and into said supplemental intake. At an end of said supplemental intake distal from a proximal end thereof which is in fluid communication with the intake manifold, there is provided a source of water which is permitted to selectively enter said distal end of said supplemental conduit in a limited quantity which, as it passes through said apertured supplemental conduit in the direction of said manifold, is initially evaporated into gaseous form and, thereafter, resultant from a temperature in excess of 700 degrees Fahrenheit to which said supplemental intake is elevated, hydrolyzed into its constituent chemical components of oxygen and hydrogen. Similarly, carbon monoxide, which is drawn through the apertures into the supplemental intake conduit, physically adheres to the molecules of said oxygen and hydrogen, to thereby modulate the rate of burning thereof. Accordingly, the resultant supplemental input to the internal combustion engine is a combination of the recycled fuel values of the exhaust gas stream and the gaseous hydrogen and oxygen derivative of the chemical separation of said water into its constituent elements. This gives rise to a significant and cost-effective performance enhancement of the internal combustion engine.

It is accordingly an object of the present invention to provide a safe, economical and effective gas turbocharger system for an internal combustion engine.

It is another object to provide a means of recycling unused fuel values in an exhaust gas stream from an internal combustion engine.

It is a further object of the invention to provide a gaseous fuel enriching subsystem combining the fuel values of exhaust gas recycling and the fuel values of hydrolyzed water vapor.

It is a yet further object to provide a gaseous fuel enriching subsystem which will reduce undesirable emissions from an internal combustion engine while increasing fuel efficiency.

The above and yet other objects and advantages of the present invention will become apparent from the hereinafter set forth Brief Description of the Drawings, Detailed Description of the Invention and claims appended herewith.

DETAILED DESCRIPTION OF THE INVENTION

Figure 1:
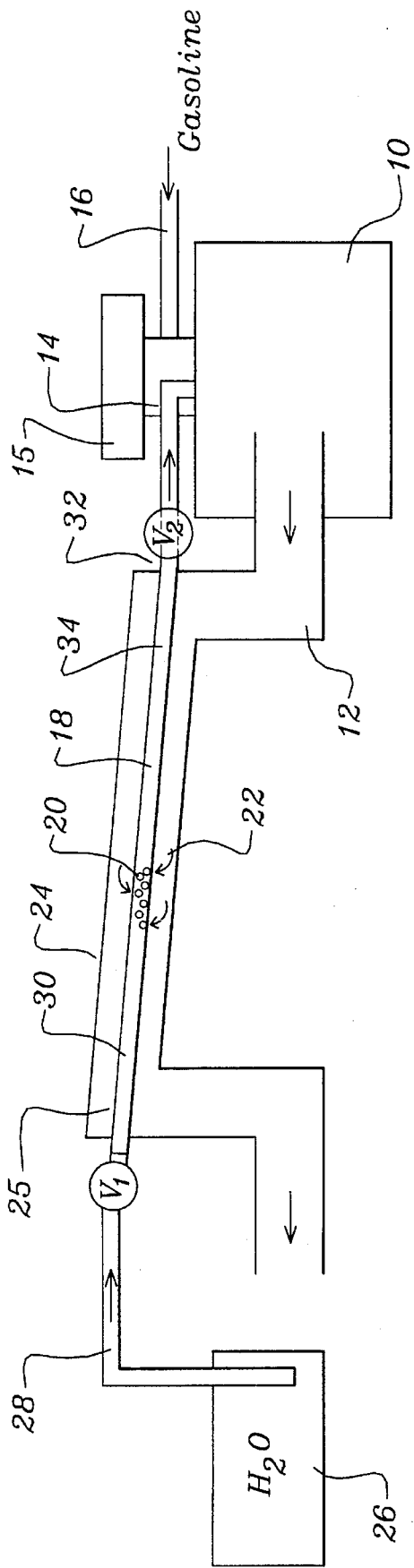
FIG. 1 is a schematic view of a first embodiment of the inventive gaseous fuel enriching subsystem.

With reference to the view of FIG. 1 there is shown an internal combustion engine 10 including therein an exhaust conduit 12 and an intake manifold 14. Further shown is gasoline fuel intake 16, from the fuel pump (not shown), to said manifold 14.

With further reference to FIG. 1 there is shown a supplemental intake conduit 18 which, as may be noted, is provided with a multiplicity of apertures 20. The function of such apertures is to permit the lower gas pressure, i.e., relative vacuum that exists within said supplemental conduit 18 to draw substantial portions of exhaust gas 22 from exhaust conduit 12 into said conduit 18 through said apertures 20. It is to be understood that a central portion 24 of exhaust conduit 12 is annularly disposed about supplemental intake conduit 18 which is tilted upward at its distal end 25 relative to its proximal end 32. It is, accordingly, to be appreciated that the use of apertures 20 permit recycling of uncombusted fluid values within the exhaust gas stream, through conduit 18, to manifold 14 and therefrom into engine 10.

As a source of added power, at a low incremental system cost, there is provided a water source 16 which, as is indicated by arrow 28, is permitted to selectively enter conduit 18 through the operation of valve V1.

Due to the high temperature, that is, a temperature in excess of 700 degrees which is generated by the exhaust gas within conduit 12, supplemental conduit 18 will be elevated to a considerable temperature. This temperature is sufficient to vaporize water within region 30 of conduit 18 and, further, toward proximal end 32, to cause the hydrolysis in region 34 of such water vapor into its chemical constituents of oxygen and hydrogen.

Carbon monoxide, which is drawn into apertures 20 as a part of the exhaust gas 22, will physically adhere, as by ionic bonding, to molecules of said oxygen and hydrogen to thereby modulate the rate of burning thereof. The result is, accordingly, that of a supplemental fuel input, in which a combination of (1) uncombusted fuel values from gasoline and (2) hydrogen and oxygen from hydrolyzed water vapor, are all inputted to a normally open safety valve V2 and, therefrom, in a selectable manner, furnished to manifold 14 where a mixture with atomized gasoline from fuel intake 16 will occur, the result thereof being a highly enriched fuel input to engine 10.

Figure 2:
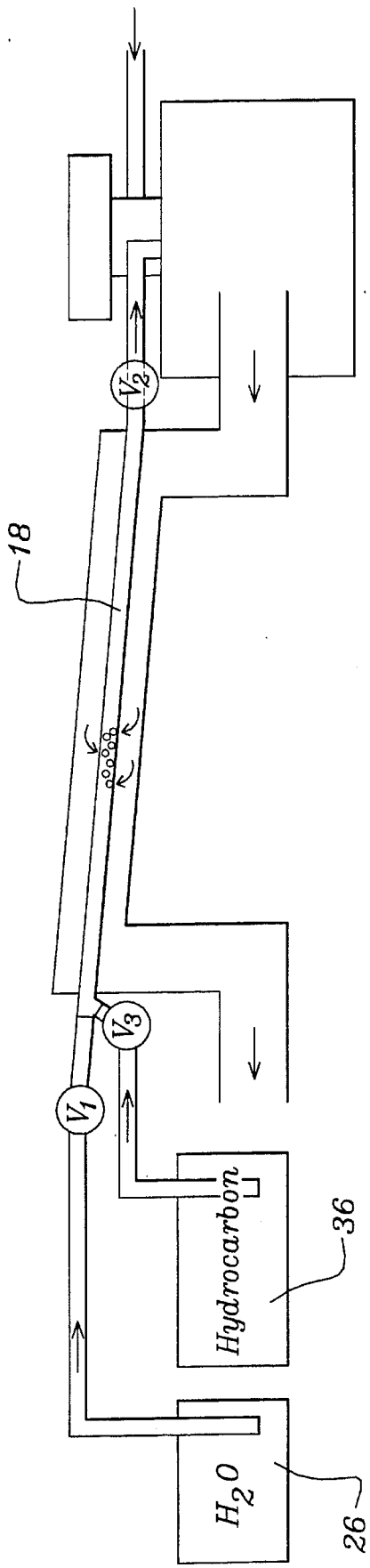
FIG. 2 is a schematic view of a second embodiment of the invention.

With reference to FIG. 2, there is shown a second embodiement of the invention in which a tank 36 for the containment of a hydrocarbon such as oil is provided so that, through valve V3, its thermal values may be added to yet further enrich the mixture of gaseous fuels carried within supplemental intake 18, to valve V2 and to the input to manifold 14.

It is also noted that, in a further embodiment, the hydrocarbon fuel of tank 36 may constitute the sole fuel source required to operate engine 10.

As above noted, it is advantageous to position distal end 25 of supplemental conduit 18 at a higher level than proximal end 32. It has been found that such an orientation of the distal end relative to the proximal end of conduit 18 enables gravity to assist the negative (suction) pressure within conduit 18 to thereby facilitate the movement of the gaseous mixture, which would otherwise attempt to advance toward end 25, into value the manifold 14.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas of principles of this invention as sent forth in the claims appended herewith.

Having thus described my invention what I claim as new, useful and non-obvious and, accordingly, secure by Letters Patent of the U.S. is:

1. A gaseous fuel enriching subsystem for an internal combustion engine comprising:

(a) a supplemental intake conduit to an intake manifold of said internal combustion engine, said conduit having a multiplicity of apertures therein;

(b) an exhaust gas conduit from said internal combustion engine, said conduit annularly surrounding said intake conduit in which gaseous exhaust from said exhaust conduit is through said apertures, maintained in fluid communication with an interior of said supplemental intake conduit; and (c) a water supply input to said supplemental intake conduit at an end of said conduit opposite to said intake manifold, whereby thermal values from said exhaust gas conduit, imparted to said supplemental intake, will elevate the temperature of said water, firstly evaporating the same and subsequently, hydrolyzing said water prior to its entry into said manifold, this producing a gaseous mixture with fuel value of said exhaust as entering said supplemental intake through said apertures.

2. The system as recited as recited in claim 1, further comprising:

(a) valve means in fluid communication with an output of said water supply and an input to said supplemental intake conduit; and (b) valve means in fluid communication with an output of said supplemental intake conduit and an input to said manifold.

3. The system as recited in claim 2, in which an elevation of an end of said supplemental intake conduit nearest to said water supply valve defines a higher elevation than an end of said supplemental intake conduit nearest said manifold.

4. The system as recited in claim 1, further comprising:

an auxiliary fuel input to said intake conduit and valve means therewith.

5. The system as recited in claim 4, in which said auxiliary fuel comprises oil.

\* \* \* \* \*